US011913619B2

(12) United States Patent
Fedosik et al.

(10) Patent No.: US 11,913,619 B2
(45) Date of Patent: Feb. 27, 2024

(54) LIGHTING DEVICE AND PRODUCTION METHOD

(71) Applicant: HELLA GmbH & Co. KGaA, Lippstadt (DE)

(72) Inventors: Dmitry Fedosik, Lippstadt (DE); Franz-Josef Kalze, Harsewinkel (DE); Alexander Klarius, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/073,965

(22) Filed: Dec. 2, 2022

(65) Prior Publication Data

US 2023/0096363 A1 Mar. 30, 2023

Related U.S. Application Data

(63) Continuation of application No. PCT/EP2021/063135, filed on May 18, 2021.

(30) Foreign Application Priority Data

Jun. 3, 2020 (DE) ..................... 10 2020 114 767.8

(51) Int. Cl.

| | |
|---|---|
| ***F21S 41/63*** | (2018.01) |
| ***F21S 41/265*** | (2018.01) |
| ***F21S 41/663*** | (2018.01) |
| ***F21S 41/143*** | (2018.01) |
| ***F21S 41/153*** | (2018.01) |

(Continued)

(52) U.S. Cl.

CPC ........... *F21S 41/265* (2018.01); *F21S 41/143* (2018.01); *F21S 41/153* (2018.01); *F21S 41/29* (2018.01); *F21S 41/635* (2018.01); *F21S 41/645* (2018.01); *F21S 41/663* (2018.01)

(58) Field of Classification Search

CPC ..................................................... F21S 41/635

See application file for complete search history.

(56) References Cited

U.S. PATENT DOCUMENTS

| | | | |
|---|---|---|---|
| 4,768,135 A | 8/1988 | Kretschmer et al. |
| 5,915,829 A | 6/1999 | Kalze et al. |

(Continued)

FOREIGN PATENT DOCUMENTS

| | | |
|---|---|---|
| AT | 517519 A1 | 2/2017 |
| DE | 3601388 A1 | 7/1987 |

(Continued)

OTHER PUBLICATIONS

International Search Report dated Jul. 26, 2021 in corresponding application PCT/EP2021/063135.

*Primary Examiner* — Sean P Gramling

(74) *Attorney, Agent, or Firm* — Muncy, Geissler, Olds & Lowe , P.C.

(57) ABSTRACT

A lighting device for vehicles having a light source apparatus for emitting light, having an optical apparatus, which contains a lens arrangement with a multiplicity of lenses, for deflecting the light in accordance with a specified light distribution, and having a positioner for adjusting a lens along an optical axis of the lens arrangement, wherein the positioner is implemented as an apparatus for setting basic scatter width in such a manner that light can be projected in different scatter widths for a specified basic lighting function.

9 Claims, 2 Drawing Sheets

(51) Int. Cl.

| | |
|---|---|
| ***F21S 41/29*** | (2018.01) |
| ***F21S 41/64*** | (2018.01) |

(56) References Cited

U.S. PATENT DOCUMENTS

| | | | | |
|---|---|---|---|---|
| 9,494,288 | B2 | 11/2016 | Kobayashi | |
| 10,001,254 | B2 | 6/2018 | Mayer | |
| 10,081,293 | B2 | 9/2018 | Ahn et al. | |
| 10,670,220 | B2 | 6/2020 | Reinprecht et al. | |
| 11,339,938 | B2 | 5/2022 | Schneider et al. | |
| 2014/0098539 | A1 | 4/2014 | Inaba | |
| 2014/0175978 | A1* | 6/2014 | Kobayashi ............ | F21S 41/635 362/487 |
| 2022/0010940 | A1* | 1/2022 | Schneider ............ | B60Q 1/0041 |

FOREIGN PATENT DOCUMENTS

| | | | |
|---|---|---|---|
| DE | 19625923 | A1 | 1/1998 |
| DE | 102006053019 | A1 | 5/2008 |
| DE | 102017203573 | A1 | 4/2018 |
| DE | 102018008760 | A1 | 4/2019 |
| EP | 2752615 | A1 | 7/2014 |
| GB | 229028 | A | 2/1925 |
| WO | WO2016179620 | A1 | 11/2016 |

* cited by examiner

LIGHTING DEVICE AND PRODUCTION METHOD

This nonprovisional application is a continuation of International Application No. PCT/EP2021/063135, which was filed on May 18, 2021, and which claims priority to German Patent Application No. 10 2020 114 767.8, which was filed in Germany on Jun. 3, 2020, and which are both herein incorporated by reference.

BACKGROUND OF THE INVENTION

Field of the Invention

The present invention relates to a lighting device for vehicles having a light source apparatus for emitting light, having an optical apparatus, which contains a lens arrangement with a multiplicity of lenses, for deflecting the light in accordance with a specified light distribution, and having a positioner for adjusting a lens along an optical axis of the lens arrangement.

Description of the Background Art

Furthermore, the invention relates to a method for producing a lighting device, wherein components of the lighting device are assembled for producing it, and wherein a lens of the lighting device is moved along an optical axis.

Known from DE 196 25 923 A1, which corresponds to U.S. Pat. No. 5,915,829, which is incorporated herein by reference, is a lighting device for vehicles having a light source apparatus and an optical apparatus, by which means a specified lighting function, for example low beam light distribution, can be generated. The optical apparatus includes a lens arrangement with a lens that is mounted so as to be adjustable along the optical axis of the lens arrangement. The adjustment of the lens is accomplished by means of a positioner that serves for basic setting of the lighting device during installation of the same in a vehicle. It is ensured by means of such a calibration of the lighting device that a cutoff line of the lighting function generated by means of the lighting device meets legal requirements or that no undesirable dazzling of oncoming traffic occurs when the lighting device is operated to generate a low beam function.

Known from DE 10 2006 053 019 A1 is a lighting device for vehicles having a light source apparatus and an optical apparatus for generating a specified light distribution. The optical apparatus includes a lens arrangement with a multiplicity of lenses. The lighting device further includes a positioner, by which means a lens of the lens arrangement can be adjusted along the optical axis of the lens arrangement so that a scatter width of the lighting device can be changed as a function of the speed of the vehicle during operation of the lighting device. A continuous adaptation of a light distribution to the current traffic situation can advantageously take place by this means.

SUMMARY OF THE INVENTION

It is therefore an object of the present invention to provide a lighting device for vehicles as well as a production method so that a manufacturing cost for producing the lighting device can be reduced in a simple way.

To attain this object, the invention is characterized in that the positioner is implemented as an apparatus for setting basic scatter width in such a manner that light can be projected in different scatter widths for a specified basic lighting function.

According to an exemplary embodiment of the invention, an apparatus for setting basic scatter width is provided, by which means the lens arrangement can be set in such a manner that a specified basic lighting function can be projected. The basic lighting function is predefined. Preferably the basic lighting function is implemented as a low beam light distribution that meets legal requirement with regard to the position of a cutoff line. The basic lighting function is created by a light distribution that can have different scatter widths depending on the vehicle manufacturer. According to the invention, different scatter widths are set for the same basic lighting function, for example low beam function. The installation of different lenses for generating light distributions with different scatter widths to create the same basic lighting function can advantageously be dispensed with. The basic lighting function with different scatter widths can be generated by the same components, which simplifies fabrication of the lighting device. A calibration of the lighting device to set the cutoff line is carried out after installation of the lighting device in the vehicle, wherein preferably the entire lens arrangement is adjusted.

The lens arrangement can have a basic setting lens that is arranged to be movable as a function of a specified scatter width characterizing the basic lighting function. A specified basic scatter width of the basic lighting function can be permanently set by means of the basic setting. Advantageously, the different scatter widths of the light distribution or of the basic lighting function can be preset by means of the adjustment of a single lens.

The basic setting lens that has been placed in the basic setting by means of the apparatus for setting basic scatter width can be fixed in its basic setting, so that the same scatter width is always projected during operation of the lighting device when the basic lighting function is set. The projection scale is permanently set as a result.

The basic setting lens can be mounted in such a manner that the lens arrangement has a first focal length in a maximum focal length range in a first end position of the basic setting lens and has a second focal length in a minimum focal length range in a second end position of the basic setting lens. Preferably the maximum focal length range is in the range from 30 mm to 40 mm, and the minimum focal length range is in the range from 15 mm to 25 mm, so that a relatively great scatter width of the basic lighting function can be preset.

The basic setting lens can be mounted in such a manner that it can be adjusted by 40 mm to 60 mm between its first end position and its second end position. A doubling of the projection scale is advantageously ensured by this means so that it is possible to generate a large selection of manufacturer-specified basic lighting functions.

An aperture stop of the lens arrangement can be arranged to be movable along the optical axis thereof so that an improvement in projection quality is made possible. The arrangement of the aperture stop, and thus a stop size, is dependent on a position that has been set of the basic setting lens.

The lens arrangement can haves at least four lenses so that a high degree of projection quality is ensured.

The light source apparatus can include a matrix of light sources that can each be controlled individually. As a result of the multiplicity of light sources to be controlled individually, a variation in the light distribution for creating the basic lighting function is ensured with regard to an illumination centroid and/or the light intensity of the basic lighting function, wherein the scatter width of the basic lighting function is specified solely by the lens arrangement.

The optical apparatus can haves a liquid crystal arrangement with a multiplicity of individually controllable pixels (LCD pixel arrangement) or a micromirror arrangement with a multiplicity of individually controllable micromirrors (DMD). Advantageously, the lighting device is implemented as a high-resolution headlight by which means different light distributions, for example town light, motorway light, glare-free high beam, can be generated. The specified light distribution can be addressed on a pixel basis and with high resolution (angle less than 0.1°).

In order to attain the object, the method according to the invention includes that the lens, as a basic setting lens, is moved into a scatter width setting position, in which the lighting device creates a specified basic lighting function, during assembly of the lighting device.

An advantage of the method according to the invention is in that a customer-specific basic setting of the lighting device can be accomplished without changing the components, which is to say with identical components.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
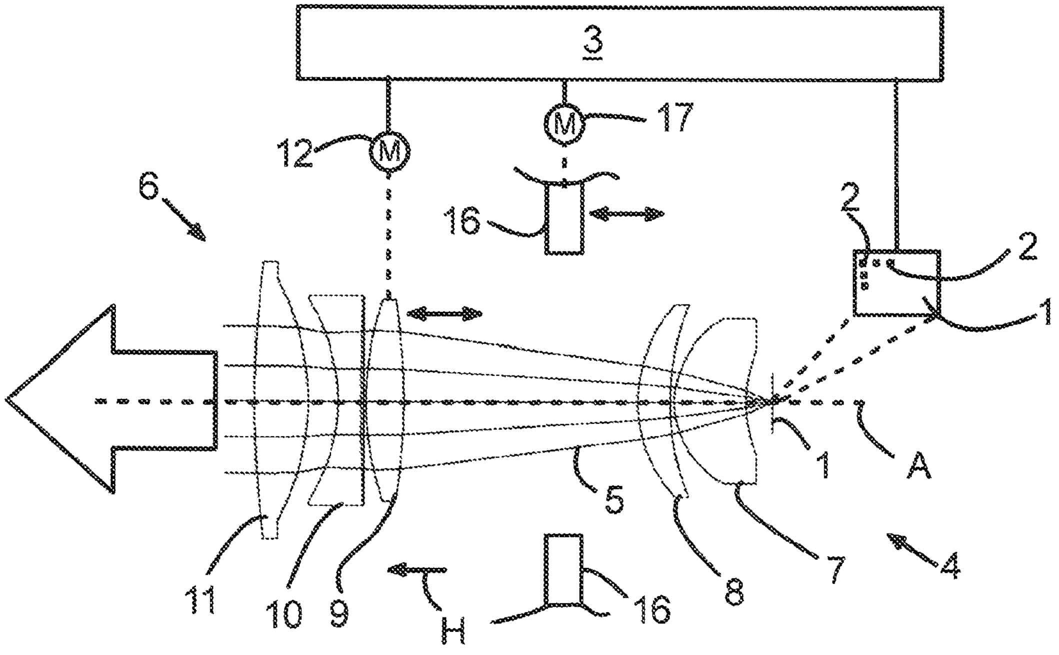
FIG. 1 is a schematic representation of the lighting device in a first end position of a basic setting lens.

The lighting device has a light source apparatus 1 (component), which includes a multiplicity of light sources 2 that are arranged in the manner of a matrix and that are each individually controllable. The individual light sources 2 can be controlled in accordance with a specified lighting function or light distribution by means of a control device 3.

In addition, the lighting device includes an optical apparatus 4 by means of which the light 5 emitted by the light source apparatus 1 can be deflected in accordance with a specified light distribution. The optical apparatus 4 includes a lens arrangement 6 with a multiplicity of lenses (components), in the present exemplary embodiment five lenses 7, 8, 9, 10, 11. A first pair of lenses 7, 8 is arranged at the back in the main direction H of emission, which is to say the light 5 emitted by the light source apparatus 1 strikes the first pair of lenses 7, 8 first. The first pair of lenses 7, 8 is arranged in a fixed position. A second pair of lenses 10, 11 of the lens arrangement 6 is arranged in front of the first pair of lenses 7, 8 in the main direction H of emission, namely is arranged in a fixed position at a defined distance a. The light 5 from the light source apparatus 1 impinges on the second pair of lenses 10, 11 only after it has impinged on the first pair of lenses 7, 8.

Figure 2:
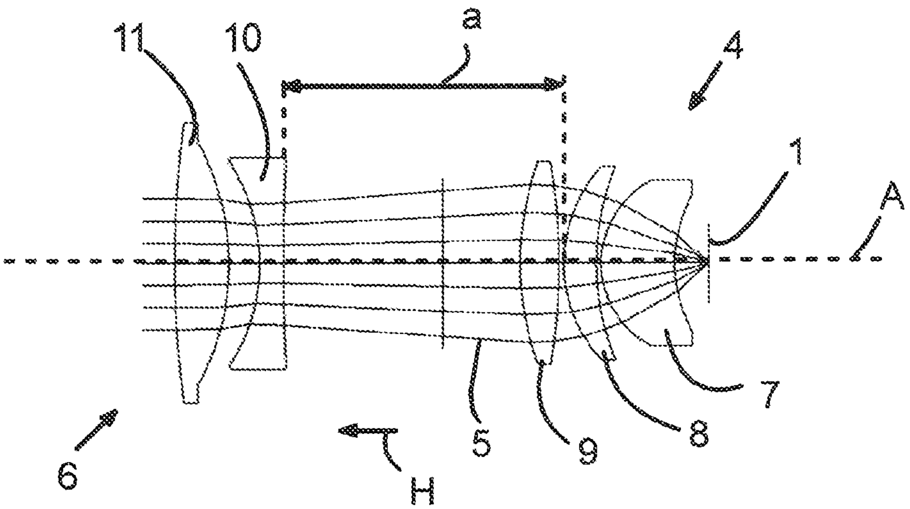
FIG. 2 is a schematic representation of the lighting device in a second end position of a basic setting lens.

Arranged between the first pair of lenses 7, 8 and the second pair of lenses 10, 11 is a lens that is movable along an optical axis A of the lens arrangement 6 and that, as basic setting lens 9, is arranged so as to be adjustable between a first end position shown in FIG. 1 and a second end position shown in FIG. 2. An apparatus 12 for setting basic scatter width, which preferably is implemented as an actuator or motor and receives a control signal from the control device 3, serves to adjust the basic setting lens 9. When the basic setting lens 9 is in the first end position, it is located in the vicinity of the second pair of lenses 10, 11, wherein the lens arrangement 6 has a first focal length in a maximum focal length range, preferably in a focal length range from 30 mm to 40 mm, in particular 34 mm to 38 mm, in particular 36 mm. In the second end position according to FIG. 2, the basic setting lens 9 is located in the vicinity of the first pair of lenses 7, 8. In the second end position of the basic setting lens 9, the lens arrangement 6 has a minimum focal length range, wherein a second focal length is in the range from 15 mm to 25 mm, preferably 18 mm to 22 mm, in particular 20 mm. In the present exemplary embodiment, the maximum adjustment travel or the distance between the first pair of lenses 7, 8 and second pair of lenses 10, 11 is in the range from 40 mm to 60 mm, preferably 50 mm, so that the projection scale or a scatter width of the basic lighting function can be virtually doubled.

Figure 3:
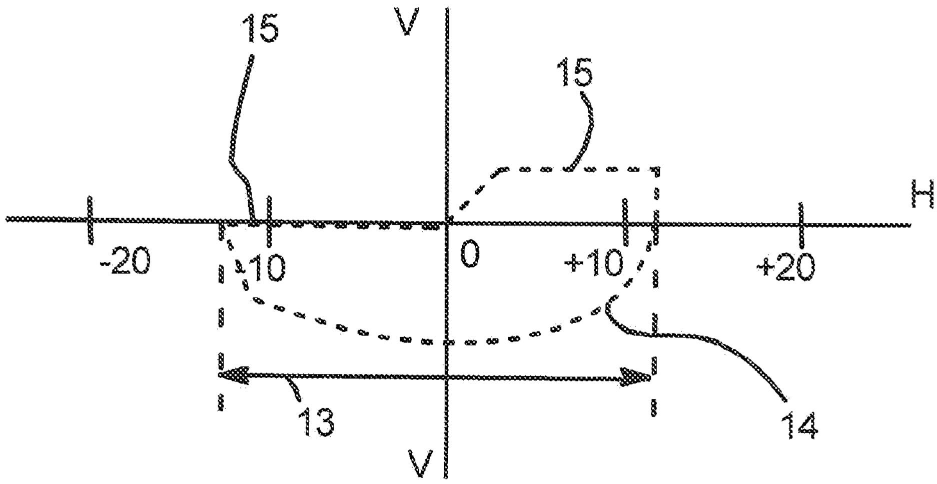
FIG. 3 is a schematic representation of a basic lighting function when the basic setting lens is fixed in the first end position as in FIG. 1.
Figure 4:
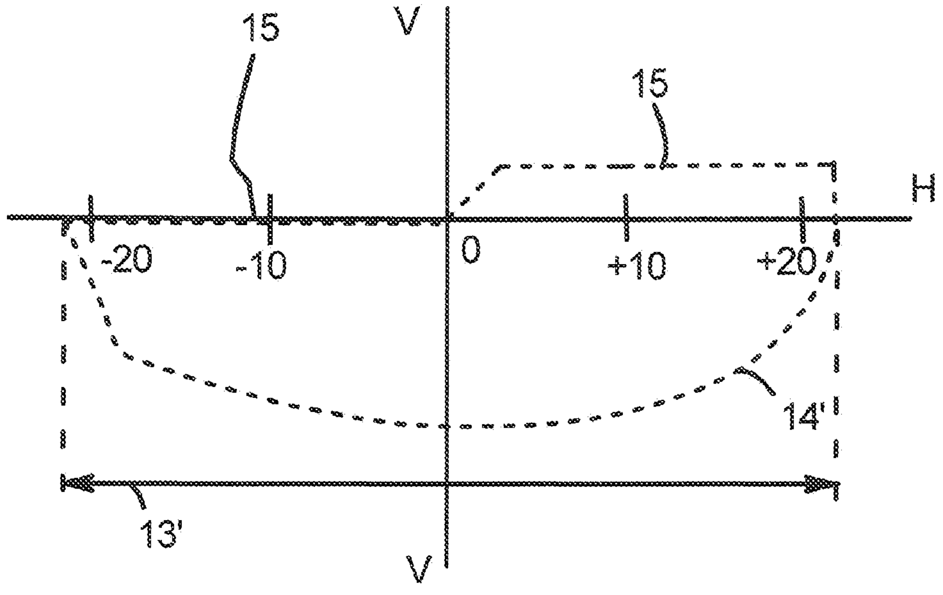
FIG. 4 is a schematic representation of the basic lighting function when the basic setting lens is fixed in the second end position as in FIG. 2.

As is evident from FIGS. 3 and 4, a scatter width 13, 13' of the basic lighting function implemented as a low beam light distribution 14, 14' can be increased from ±10° to ±20° by moving the basic setting lens 9 from the first end position according to FIG. 1 to the second end position according to FIG. 2. The scatter width can thus be preset between the minimum scatter width 13 according to FIG. 3 and the maximum scatter width 13' according to FIG. 4, namely as a function of requirements of the vehicle manufacturer. While the scatter widths 13, 13' of the low beam light distributions 14, 14' can be different, the low beam light distributions 14, 14' each have the same cutoff line 15, which is to say the cutoff lines 15 of the light distributions 14, 14' extend at the same vertical height. The desired scatter width of the specified light distribution 14, 14' for creating the basic lighting function is accomplished at production of the lighting device with the fixing of the basic setting lens 9 in its basic setting, wherein the basic setting is located in a range between the locations shown in FIG. 1 and FIG. 2. The basic setting constitutes a scatter width setting position of the basic setting lens 9. As soon as the basic setting lens 9 is fixed during production of the lighting device, the basic scatter width of the lighting device is permanently set. After installation of the lighting device in the vehicle, a calibration of the lighting device takes place, wherein the height or vertical setting of the cutoff line 15 of the basic lighting function is set.

According to the invention, therefore, a basic setting of the scatter width 13, 13' takes place solely during the production of the lighting device, which is to say prior to installation of the lighting device in the vehicle.

Preferably, the lens arrangement 6 has an aperture stop 16, which can be arranged so as to be movable along the optical axis A of the lens arrangement 6 by means of an aperture positioner 17. As a result, the projection quality can be improved as a function of the position or preset location of the basic setting lens 9.

In the present exemplary embodiment, the basic setting lens 9 is implemented as a converging lens.

According to an example, the optical apparatus 4 can have, in addition to the above-described embodiment, a liquid crystal arrangement (LCD pixel arrangement) with a multiplicity of individually controllable pixels (liquid crystal elements) or a micromirror arrangement (DMD pixel arrangement) with a multiplicity of individually controllable micromirrors (pixels). As a result, the basic light distribution or low beam light distribution 14, 14' can thus be addressed on a pixel basis and with high resolution (angle less than 0.1°), which results in a glare-free high beam light distribution (adaptive high beam) when the pixels are driven appropriately.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device comprising:

a light source apparatus to emit light;

an optical apparatus that contains a lens arrangement with at least two lenses to deflect the light in accordance with a specified light distribution to provide a basic lighting function; and a positioner to adjust a position of a first one of the lenses along an optical axis of the lens arrangement such that a deflection of the light is adjustable to different scatter widths, wherein the positioner adjusts the position of the first one of the lenses to set a basic scatter width for the basic lighting function; and an aperture stop that is movable along the optical axis of the lens arrangement, wherein, in a fully assembled state of the lighting device, the first one of the lenses remains permanently fixed in the position that provides the basic scatter width.

2. The lighting device according to claim 1, wherein the first one of the lenses is a basic setting lens that is arranged to be movable as a function of the basic scatter width to provide the basic lighting function.

3. The lighting device according to claim 2, wherein the basic setting lens is mounted such that the lens arrangement has a first focal length in a maximum focal length range in a first end position of the basic setting lens, and has a second focal length in a minimum focal length range in a second end position of the basic setting lens.

4. The lighting device according to claim 3, wherein the basic setting lens is mounted so as to be adjustable by 40 mm to 60 mm or by 50 mm, between the first end position and the second end position.

5. The lighting device according to claim 1, wherein the at least two lenses of the lens arrangement includes at least four lenses.

6. The lighting device according to claim 1, wherein the at least two lenses of the lens arrangement includes five lenses, and wherein the five lenses includes two pairs of lenses and the first one of the lenses that is arranged between the two pairs of lenses.

7. The lighting device according to claim 2, wherein the basic setting lens is a converging lens.

8. The lighting device according to claim 1, wherein the light source apparatus has a plurality of individually controllable light sources that are arranged in a matrix.

9. A method for producing a lighting device, the method comprising:

assembling components of the lighting device including an aperture stop that is movable along an optical axis of a lens arrangement of the lighting device, wherein, during assembly of the components, a basic setting lens of the lens arrangement of the lighting device is moved along the optical axis into a basic scatter width setting position in which the lighting device creates a basic lighting function with a specified light distribution, and wherein, in a fully assembled state of the lighting device, the basic setting lens remains permanently fixed in the basic scatter width setting position.

* * * * *